(12) United States Patent
Rumpf

(10) Patent No.: US 7,017,557 B2
(45) Date of Patent: Mar. 28, 2006

(54) FEED DEVICE

(75) Inventor: Bernd Rumpf, Nidderau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/809,982

(22) Filed: Mar. 26, 2004

(65) Prior Publication Data

US 2004/0216783 A1    Nov. 4, 2004

(30) Foreign Application Priority Data

Mar. 28, 2003   (DE) ................ 103 14 223

(51) Int. Cl.
*F02M 37/04*    (2006.01)

(52) U.S. Cl. .................... 123/509; 123/516

(58) Field of Classification Search ........ 123/509, 123/516, 514, 518, 520, 519
See application file for complete search history.

(56) References Cited

U.S. PATENT DOCUMENTS

| | | | | |
|---|---|---|---|---|
| 4,279,232 A | * | 7/1981 | Schuster et al. ........... 123/516 |
| 4,878,474 A | * | 11/1989 | Hack, Jr. ................. 123/516 |
| 5,095,880 A | * | 3/1992 | Ricks ..................... 123/516 |
| 5,657,734 A | * | 8/1997 | Sawamoto et al. ......... 123/519 |
| 6,029,635 A | * | 2/2000 | Sekine et al. ............. 123/516 |
| 6,076,509 A | * | 6/2000 | Kyuma .................... 123/516 |
| 6,213,726 B1 | * | 4/2001 | Tuckey .................. 417/199.1 |
| 6,289,879 B1 | * | 9/2001 | Clausen et al. ............ 123/516 |
| 6,679,226 B1 | * | 1/2004 | Burke et al. ............... 123/509 |

FOREIGN PATENT DOCUMENTS

| | | |
|---|---|---|
| DE | 43 35 858 A1 | 4/1995 |
| DE | 197 19 607 A1 | 9/1998 |
| DE | 299 19 287 U1 | 4/2000 |
| DE | 198 57 863 A1 | 6/2000 |
| DE | 199 55 133 A1 | 5/2001 |
| DE | 101 17 324 A1 | 8/2002 |
| GB | 126123 | 4/1919 |
| GB | 1046535 | 10/1966 |
| NL | 59628 | 6/1947 |
| WO | WO 00/56138 | 3/2000 |

* cited by examiner

*Primary Examiner*—Carol S. Miller
(74) *Attorney, Agent, or Firm*—Richard A. Speer; Mayer, Brown, Rowe & Maw LLP

(57) ABSTRACT

In a feed device (2) for a motor vehicle, a ventilation element (10) is arranged in a feed line (7) which is guided into an intermediate tank (8) arranged upstream of a surge chamber (3). The ventilation element (10) has an opening (11) which is closed when the fuel is flowing and is released if the flow fails. Drainage of the intermediate tank (8) by means of a siphon effect is therefore avoided.

1 Claim, 2 Drawing Sheets

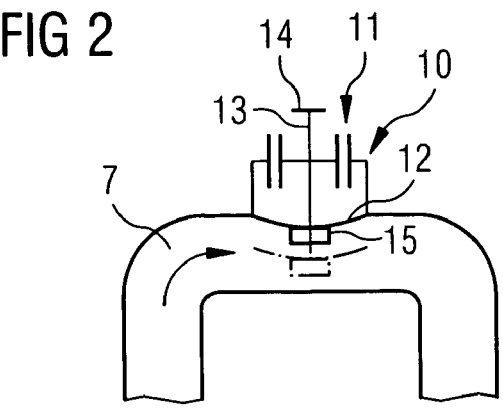
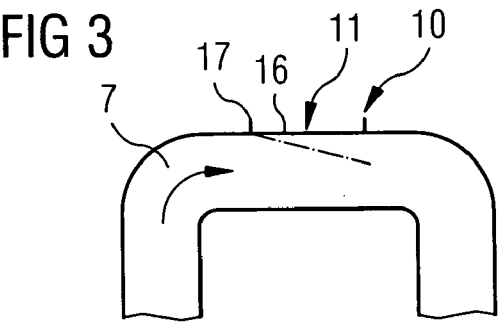
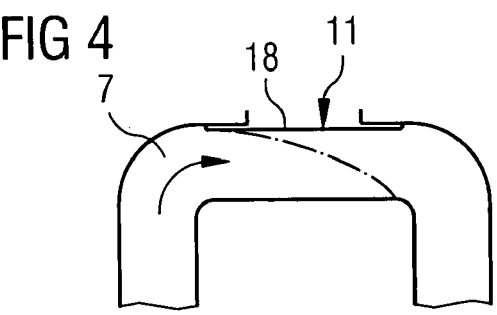
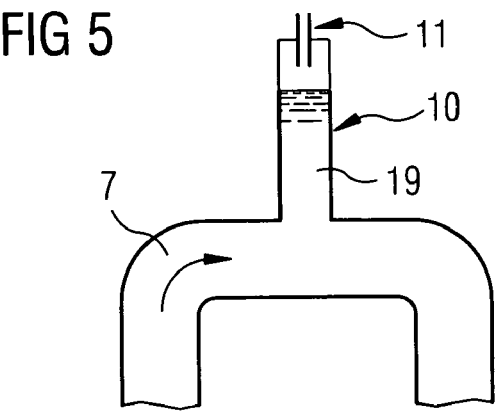

FEED DEVICE

BACKGROUND OF THE INVENTION

The invention relates to a feed device for a motor vehicle having a surge chamber which is provided for arrangement in a fuel tank, having a filling device for the surge chamber, having a sucking jet pump which is arranged outside the surge chamber and is intended for feeding fuel via a feed line into the surge chamber or into an intermediate tank connected to the surge chamber, and having a section of the feed line which is guided vertically downward into the intermediate tank or the surge chamber.

Feed devices of this type are frequently used in fuel tanks today and are known from practice. The feed line is guided directly into the intermediate tank or the surge chamber to avoid foaming of the fuel. If there is an interruption to the flow of fuel, for example if the sucking jet pump is switched off, fuel has to be prevented from being sucked by means of a siphon effect out of the intermediate tank or the surge chamber via the feed line. The valve could, for example, be designed as a nonreturn valve and could exclusively permit fuel to flow in one direction of the feed line. However, this requires a valve body which is arranged in the feed line and offers resistance to the flow of fuel.

The invention is based on the problem of developing a feed device of the type mentioned at the beginning in such a manner that suction of fuel out of the intermediate tank or the surge chamber is reliably avoided and that the flow in the feed line has a particularly low flow resistance.

BRIEF DESCRIPTION OF THE INVENTION

This problem is solved according to the invention by the fact that a ventilation element is arranged in the region of the highest point of the feed line, and that the ventilation element is designed to release an opening if the flow of fuel fails.

By means of this design, if the flow fails, air passes via the ventilation element into the feed line and interrupts the siphon effect. This prevents the fuel from being sucked out of the intermediate tank or the surge chamber if the sucking jet pump is switched off. The invention makes it possible to avoid a valve body which is arranged in the flow of the feed line and so the feed line has a particularly low flow resistance.

According to one advantageous development of the invention, the ventilation element is controlled in a particularly simple manner if the ventilation element has a closing body which can be moved by the pressure of the fuel in the feed line and, in a first position, covers the opening in the feed line and, in a second position, releases the opening. Since the position of the closing body is controlled by the pressure in the feed line, the flow of fuel is not obstructed.

According to another advantageous development of the invention, the securing and guidance of the closing body require particularly little outlay in terms of structure if the closing body has a bolt penetrating a wall of the feed line and if the bolt has, at its free end, a widened section which, in the first position, is at a distance from the wall of the feed line.

According to another advantageous development of the invention, a contribution is made to further reducing the structural outlay on the securing of the closing body if the closing bodies are connected to a wall of the feed line via a gastight hinge.

According to another advantageous development of the invention, a contribution is made to further reducing the resistance in the flow of the feed line if the ventilation element has a float closing the opening in the wall of the feed line.

According to another advantageous development of the invention, the ventilation element can be manufactured particularly cost-effectively if the closing body is designed as a stiff wall element.

According to another advantageous development of the invention, the flow in the feed line is capable of pressing the closing body directly against the opening if the closing body is designed as an elastic membrane.

According to another advantageous development of the invention, a moveable closing body can be avoided in a simple manner if the ventilation element has an upwardly open pipe, and if the pipe is longer than a column of fuel which can be produced by the pressure of the sucking jet pump when the fuel tank is virtually empty, and/or if the opening is designed as a throttling opening. This design enables the pipe to be filled with fuel, during operation of the sucking jet pump, to a height which corresponds to the maximum producible pressure of the sucking jet pump. When the sucking jet pump is switched off, air penetrates into the pipe through the upwardly open end of the pipe and then into the feed line.

BRIEF DESCRIPTION OF THE DRAWINGS

The invention permits numerous embodiments. To further clarify its basic principle a number of these are illustrated in the drawing and are described below. In the drawing FIG. 2 shows a ventilation element of the feed device from FIG. 1, FIG. 3 shows a further embodiment of the ventilation element of the feed device from FIG. 1 with a flap, FIG. 4 shows a further embodiment of the ventilation element with a membrane, FIG. 5 shows a further embodiment of the ventilation element with an open pipe.

DETAILED DESCRIPTION OF THE INVENTION

Figure 1:
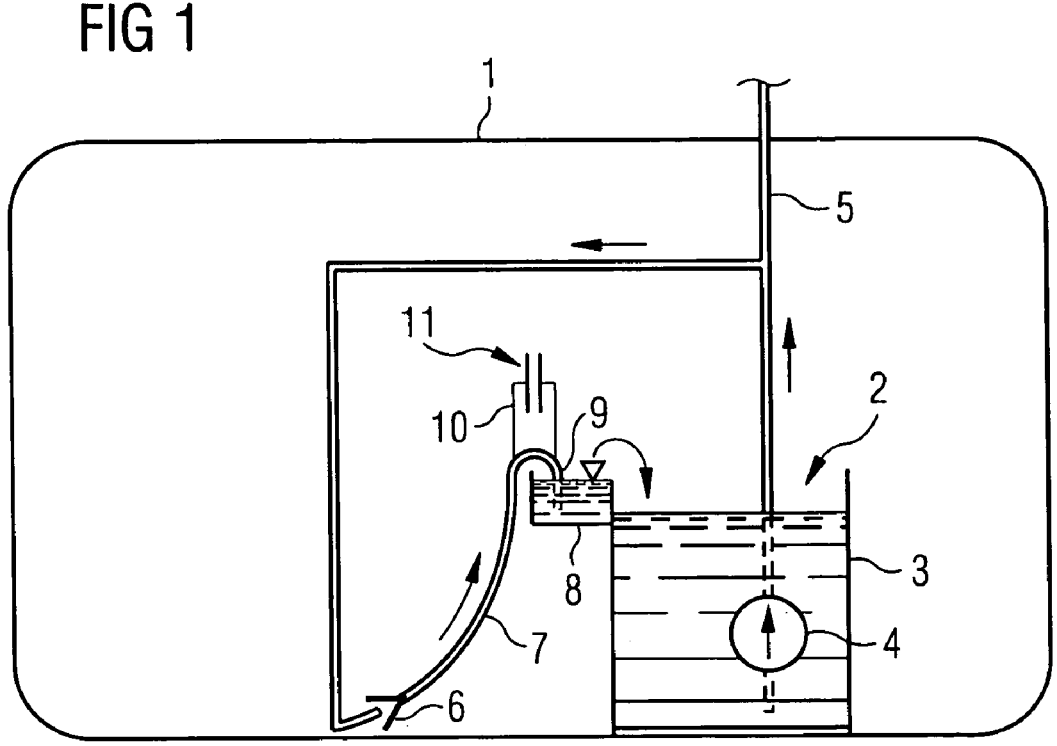
FIG. 1 shows, schematically, a fuel tank having a feed device according to the invention.

FIG. 1 shows a fuel tank 1 of a motor vehicle having a feed device 2 for feeding fuel to an internal combustion engine (not illustrated). The feed device 2 has a fuel pump 4 which is arranged in a surge chamber 3 and is driven by an electric motor. The fuel pump 4 feeds fuel from the surge chamber 3 via a forward-flow line 5 to the internal combustion engine and to a sucking jet pump 6. The sucking jet pump 6 feeds fuel from the fuel tank 1 via a feed line 7 into an intermediate tank 8 connected to the surge chamber 3. The fuel passes from the intermediate tank 8 into the surge chamber 3. For clarification purposes, the fuel flows are indicated in the drawing by arrows. The feed line 7 has a section 9 which is guided vertically downward and with which it penetrates into the intermediate tank 8. In the region of its highest point, the feed line 7 has a ventilation element 10 with an opening 11. During operation of the fuel pump 4, the sucking jet pump 6 feeds fuel through the feed line 7. When the fuel pump 4 is switched off, air passes via the opening 11 of the ventilation element 10 into the feed line 7 and prevents the intermediate tank 8 from draining due to a siphon effect.

FIG. 2 shows, on a greatly enlarged scale, the ventilation element 10 from FIG. 1 together with adjacent regions of the feed line 7. The ventilation element 10 has a closing body 12 which covers the opening 11. The opening 11 is closed in this position, so that air does not penetrate into the feed line 7 and fuel cannot escape via the opening 11. The position of the closing body 12 when the sucking jet pump 6 is switched off is illustrated in FIG. 2 by chain-dotted lines. It can be seen here that the closing body 12 has been moved downward by the gravitational force and the opening 11 has therefore been released by the closing body 12. Air can therefore penetrate into the feed line 7. The closing body 12 has a bolt 13 as guide, the bolt penetrating the wall of the feed line 7 and having a widened section 14 arranged at its end. Furthermore, the closing body 12 is connected to a float 15. When the fuel is flowing in the feed line 7, the float 15 assists the movement of the closing body 12.

FIG. 3 shows a further embodiment of the ventilation element 10, in which a closing body 16 is designed as a flap and is connected to the wall of the feed line 7 via a hinge 17 designed as a film hinge. In the position illustrated, the closing body 16 closes the opening 11 in the wall of the feed line 7. For clarification purposes, the position of the closing body 16 when the sucking jet pump 6 is switched off is illustrated by chain-dotted lines.

FIG. 4 shows a further embodiment of the ventilation element 10, in which a closing body 18 is designed as a membrane covering the opening 11. The membrane is pressed against the inside of the wall of the feed line 7 by the flow of fuel and therefore closes the opening 11. If the flow fails, the elastic membrane bends downward and releases the opening 11.

FIG. 5 shows a further embodiment of the ventilation element 10 from FIG. 1, in which the opening 11 is arranged at the free end of a pipe 19. The pipe 19 is longer than the column of fuel which can be produced by the pressure from the fuel pump 4 from FIG. 1 when the fuel tank 1 is virtually empty. Furthermore, the opening 11 is designed as a throttling opening and therefore offers resistance to a possible flow of fuel. However, air can pass virtually unobstructed through the opening 11.

The invention claimed is:

1. A feed device for a motor vehicle having a surge chamber which is provided for arrangement in a fuel tank, having a filling device for the surge chamber, having a sucking jet pump which is arranged outside the surge chamber and is intended for feeding fuel via a feed line into the surge chamber or into an intermediate tank connected to the surge chamber, and having a section of the feed line which is guided vertically downward into the intermediate tank or the surge chamber, wherein the feed device comprises a ventilation element (10) is arranged in the region of the highest point of the feed line (7) that extends between the sucking jet pump and the surge chamber, and wherein the ventilation element has an upwardly open pipe (19), and in that the pipe (19) is longer than a column of fuel which can be produced by the pressure of the sucking jet pump (6) when the fuel tank (1) is virtually empty.

* * * * *